US012579581B2

(12) United States Patent (10) Patent No.: US 12,579,581 B2
Smith et al. (45) Date of Patent: Mar. 17, 2026

(54) SYSTEM AND METHOD FOR PREVENTING FRAUD IN THE CAPTURE OF TRIP TELEMETRY DATA

(71) Applicant: QUANATA, LLC, San Francisco, CA (US)

(72) Inventors: Bennett Smith, Inver Grove Heights, MN (US); Kenneth J. Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 108 days.

(21) Appl. No.: 18/236,740

(22) Filed: Aug. 22, 2023

(65) Prior Publication Data

US 2023/0394590 A1 Dec. 7, 2023

Related U.S. Application Data

(63) Continuation of application No. 15/880,787, filed on Jan. 26, 2018, now Pat. No. 11,823,273.

(Continued)

(51) Int. Cl.
*G06Q 40/08* (2012.01)
*G06Q 30/018* (2023.01)
(Continued)

(52) U.S. Cl.
CPC ......... *G06Q 40/08* (2013.01); *G06Q 30/0185* (2013.01); *G06Q 30/0207* (2013.01); *H04W 52/0235* (2013.01)

(58) Field of Classification Search
CPC .............. G06Q 40/08; G06Q 30/0185; G06Q 30/02027; H04W 52/02
See application file for complete search history.

(56) References Cited

U.S. PATENT DOCUMENTS 6,532,543 B1 3/2003 Smith et al.
8,590,785 B1 * 11/2013 Mesaros ............ G06Q 30/0277
705/14.1

(Continued)

FOREIGN PATENT DOCUMENTS

EP 2887296 A2 * 6/2015 ......... G06Q 30/0261
EP 2993637 A1 * 3/2016 ......... G06Q 30/0201
WO 2013190380 A2 12/2013

*Primary Examiner* — Daniel S Felten
(74) *Attorney, Agent, or Firm* — BRYAN CAVE LEIGHTON PAISNER LLP

(57) ABSTRACT

Technology for identifying potentially fraudulent user behavior related to the capture and transmission of vehicle trip telemetry data is provided. Automatic and periodic attempts may be made to wake up (e.g., launch, or change to an active mode) an application installed on a mobile device configured to transmit mobile device data, including captured sensor data, to a remote computer device. Based on the sensor data, the remote computer device may determine a number, frequency, and/or duration of vehicle trips associated with the user of the mobile device. When one or more types of expected mobile device data are not received by the remote computer device after a particular attempt to wake the application, data indicating a failure to receive expected mobile device data may be recorded in a log. Based on the log, an alert indicating potentially fraudulent behavior associated with the user of the mobile device may be generated.

21 Claims, 4 Drawing Sheets

Related U.S. Application Data

(60) Provisional application No. 62/569,208, filed on Oct. 6, 2017.

(51) Int. Cl.
 G06Q 30/0207 (2023.01)
 H04W 52/02 (2009.01)

(56) References Cited

U.S. PATENT DOCUMENTS

| | | | |
|---|---|---|---|
| 8,646,060 B1 | 2/2014 | Ben Ayed | |
| 9,135,415 B2 | 9/2015 | Schaefer | |
| 9,185,117 B2 | 11/2015 | Grigg et al. | |
| 9,215,225 B2 | 12/2015 | Desai | |
| 9,460,447 B2 * | 10/2016 | Pointer | G06Q 30/0207 |
| 9,659,160 B2 | 5/2017 | Ligatti et al. | |
| 9,697,508 B1 * | 7/2017 | Ramalingam | G06Q 20/40 |
| 9,786,176 B2 | 10/2017 | Northrup et al. | |
| 9,788,211 B2 | 10/2017 | Zhang | |
| 9,858,595 B2 | 1/2018 | Barnes, Jr. | |
| 9,961,624 B1 | 5/2018 | Zait | |
| 10,257,668 B2 | 4/2019 | Shaw | |
| 10,375,082 B2 | 8/2019 | Brown et al. | |
| 10,706,704 B1 | 7/2020 | Shannon et al. | |
| 11,122,433 B2 | 9/2021 | Mahaffey et al. | |
| 2003/0227745 A1 | 12/2003 | Khoo | |
| 2009/0253410 A1 | 10/2009 | Fitzgerald et al. | |
| 2011/0010234 A1 * | 1/2011 | Lindelsee | G06Q 30/06 |
| | | | 705/14.23 |
| 2013/0238413 A1 * | 9/2013 | Carlson | G06Q 20/321 |
| | | | 705/14.25 |
| 2014/0129305 A1 * | 5/2014 | Frame | G06Q 30/0211 |
| | | | 705/14.1 |
| 2014/0143086 A1 * | 5/2014 | Birsin | G06Q 30/0631 |
| | | | 705/26.7 |
| 2014/0278970 A1 * | 9/2014 | Calman | G06Q 30/0259 |
| | | | 705/14.57 |
| 2014/0289833 A1 | 9/2014 | Briceno et al. | |
| 2015/0019443 A1 | 1/2015 | Sheets et al. | |
| 2015/0052064 A1 | 2/2015 | Karpenko et al. | |
| 2015/0095152 A1 * | 4/2015 | Walters | G06Q 30/0255 |
| | | | 705/14.53 |
| 2015/0161643 A1 * | 6/2015 | Randell | G06Q 30/0235 |
| | | | 705/14.26 |
| 2015/0269600 A1 * | 9/2015 | Randle | G06Q 30/0211 |
| | | | 705/14.14 |
| 2016/0098076 A1 | 4/2016 | Chng et al. | |
| 2016/0173447 A1 | 6/2016 | Achim et al. | |
| 2016/0234209 A1 | 8/2016 | Kahol et al. | |
| 2016/0350786 A1 * | 12/2016 | Loomis | G06Q 30/0252 |
| 2017/0076265 A1 | 3/2017 | Royyuru et al. | |
| 2017/0076274 A1 | 3/2017 | Royyuru et al. | |
| 2017/0195339 A1 * | 7/2017 | Brown | H04W 4/80 |
| 2017/0255988 A1 * | 9/2017 | Calio | G06Q 30/0261 |
| 2018/0047273 A1 | 2/2018 | Dejong et al. | |
| 2018/0247262 A1 | 8/2018 | Arena | |
| 2019/0124044 A1 | 4/2019 | Kurian | |
| 2019/0258818 A1 | 8/2019 | Yu et al. | |
| 2020/0329136 A1 | 10/2020 | Gerhardt et al. | |
| 2021/0144557 A1 | 5/2021 | Gulick, Jr. et al. | |

* cited by examiner

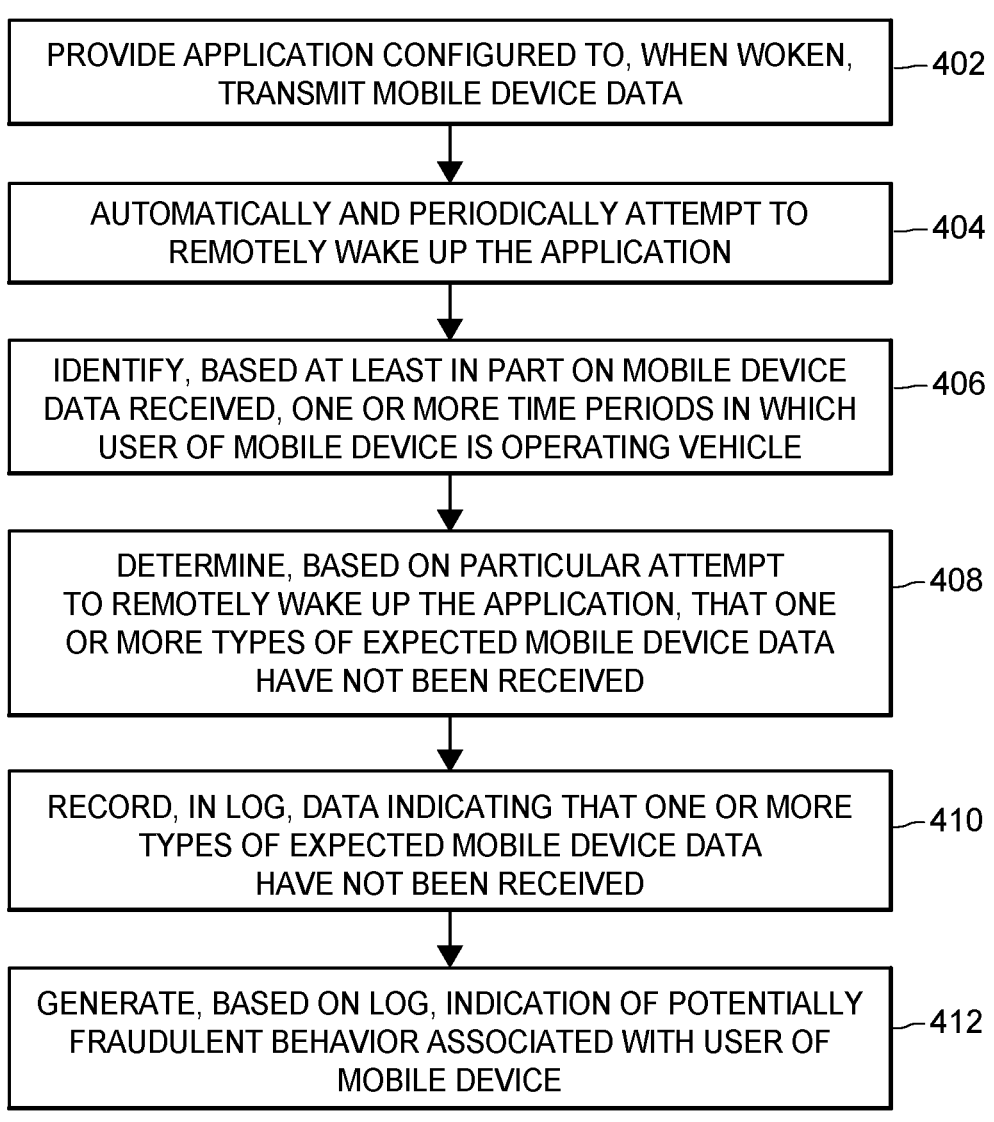

<u>400</u>

PROVIDE APPLICATION CONFIGURED TO, WHEN WOKEN, TRANSMIT MOBILE DEVICE DATA —402

AUTOMATICALLY AND PERIODICALLY ATTEMPT TO REMOTELY WAKE UP THE APPLICATION —404

IDENTIFY, BASED AT LEAST IN PART ON MOBILE DEVICE DATA RECEIVED, ONE OR MORE TIME PERIODS IN WHICH USER OF MOBILE DEVICE IS OPERATING VEHICLE —406

DETERMINE, BASED ON PARTICULAR ATTEMPT TO REMOTELY WAKE UP THE APPLICATION, THAT ONE OR MORE TYPES OF EXPECTED MOBILE DEVICE DATA HAVE NOT BEEN RECEIVED —408

RECORD, IN LOG, DATA INDICATING THAT ONE OR MORE TYPES OF EXPECTED MOBILE DEVICE DATA HAVE NOT BEEN RECEIVED —410

GENERATE, BASED ON LOG, INDICATION OF POTENTIALLY FRAUDULENT BEHAVIOR ASSOCIATED WITH USER OF MOBILE DEVICE —412

FIG. 4

SYSTEM AND METHOD FOR PREVENTING FRAUD IN THE CAPTURE OF TRIP TELEMETRY DATA

CROSS-REFERENCE TO RELATED APPLICATION

This application is a continuation of U.S. patent application Ser. No. 15/880,787, filed Jan. 26, 2018, which claims the benefit under 35 U.S.C. § 119(e) of U.S. Provisional Application No. 62/569,208 filed Oct. 6, 2017, the entire disclosures of which are incorporated herein by reference in their entirety.

FIELD

The present disclosure generally relates to vehicle telemetry systems, and more particularly to technology for identifying potentially fraudulent user behavior related to the capture and transmission of vehicle trip telemetry data.

BACKGROUND

Using the sensors of a mobile device, various data related to vehicle trips associated with a user of the device may be captured and transmitted, e.g., to an insurance provider. In particular, the sensor data may be analyzed to determine a number, frequency (e.g., number of trips per day, month, etc.), and/or duration of vehicle trips taken by the user of the mobile device. Based on the number, frequency and/or duration of such vehicle trips, a user may earn various rewards or discounts. For example, a user may receive rewards or discounts from an insurance provider when vehicle trips are less frequent or shorter. Therefore, accurate vehicle trip data is important to ensure that each user receives the proper rewards and discounts. However, some users may attempt to "game the system" by manipulating the capture, recording, or transmission of sensor data in order to prevent an insurance provider from receiving mobile device data indicative of frequent or long vehicle trips.

SUMMARY

In one aspect, a computer-implemented method is provided for identifying potentially fraudulent user behavior related to the capture and transmission of vehicle trip telemetry data. The method may include providing, to a mobile device, an application configured to, when woken, transmit mobile device data to a remote computer device. The method may further include automatically and periodically attempting to remotely wake up the application, and identifying, based at least in part on the mobile device data received by the remote computer device, one or more time periods in which a user of the mobile device may be operating a vehicle. Furthermore, the method may include determining, based on a particular attempt to remotely wake up the application, that one or more expected types of mobile device data have not been received by the remote computer device, recording, in a log, data indicating that the one or more expected types of mobile device data have not been received by the remote computer device, and generating, based on the log, an indication of a potentially fraudulent behavior associated with the user of the mobile device. In another aspect, a computing system is provided for identifying potentially fraudulent user behavior related to the capture and transmission of vehicle trip telemetry data. The computing system may include a transceiver configured to communicate data via at least one network connection, one or more memories configured to store non-transitory computer executable instructions, and a processor configured to interface with the transceiver and the one or more memories and configured to execute the non-transitory computer executable instructions. The non-transitory computer executable instructions may cause the processor to provide, to a mobile device, an application configured to, when woken, transmit mobile device data to a remote computer device. The non-transitory computer executable instructions may additionally cause the processor to automatically and periodically attempt to remotely wake up the application, and identify, based at least in part on the mobile device data received by the remote computer device, one or more time periods in which a user of the mobile device may be operating (e.g., driving) a vehicle. Furthermore, the non-transitory computer executable instructions may cause the processor to determine, based on a particular attempt to remotely wake up the application, that one or more expected types of mobile device data have not been received by the remote computer device, record, in a log, data indicating that the one or more expected types of mobile device data have not been received by the remote computer device, and generate, based on the log, an indication of a potentially fraudulent behavior associated with the user of the mobile device.

BRIEF DESCRIPTION OF THE FIGURES

FIG. 4 depicts an exemplary method for identifying potentially fraudulent user behavior related to the capture and transmission of vehicle trip telemetry data.

DETAILED DESCRIPTION

Figure 1:
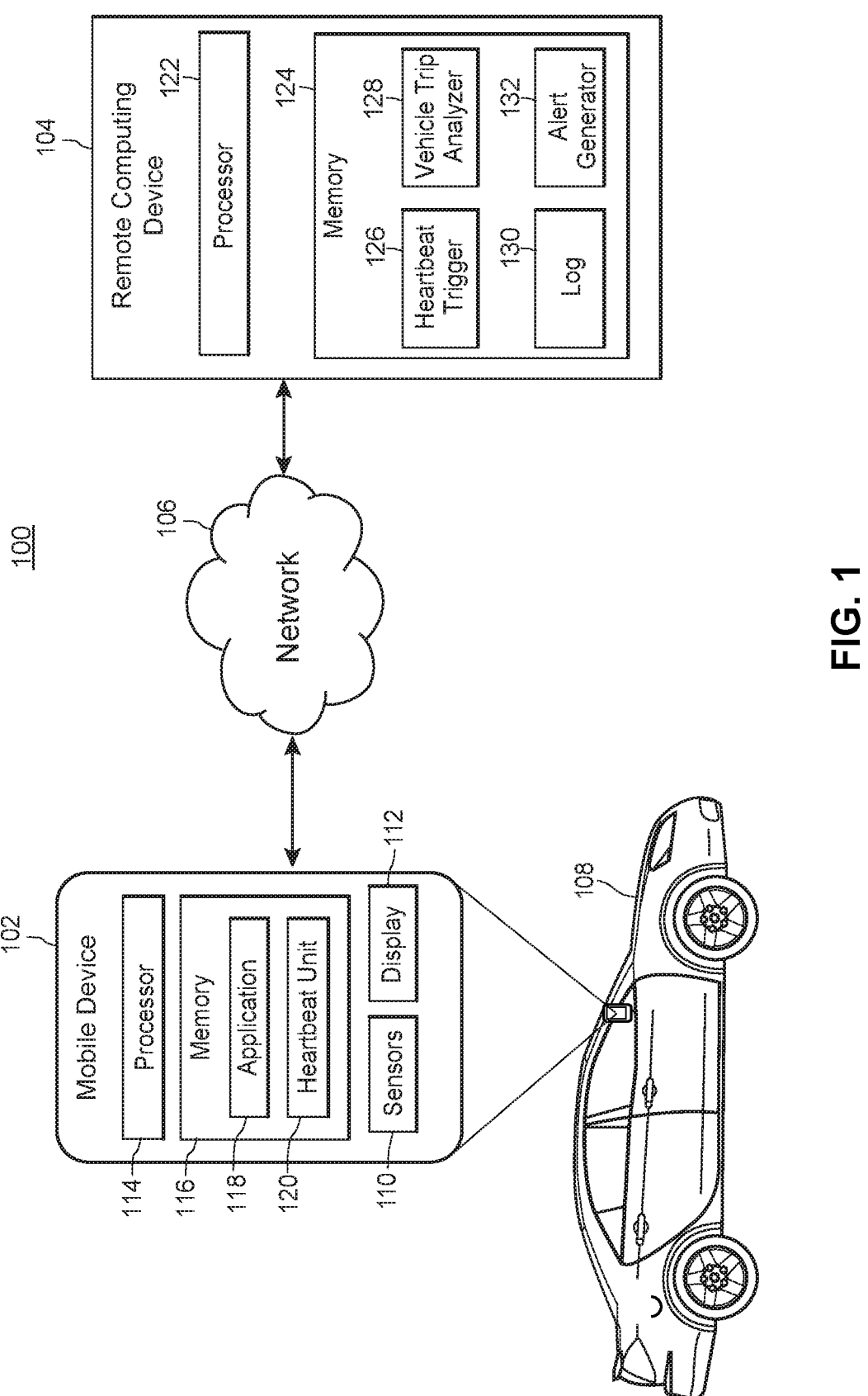
FIG. 1 depicts an exemplary system for identifying potentially fraudulent user behavior related to the capture and/or transmission of vehicle trip telemetry data.

The present embodiments may relate to, inter alia, technology for identifying potentially fraudulent user behavior related to the capture of vehicle trip telemetry data. According to certain aspects, systems and methods may automatically and periodically attempt to remotely wake up (e.g., launch or change to an active mode) an application installed on a mobile device. The application may be configured to transmit mobile device data, which may include, for instance, sensor data captured by one or more sensors associated with the mobile device, sensor permission status data, etc., when woken up. Based on the sensor data, one or more time periods in which a user of the mobile device may be operating a vehicle may be identified. Any instances of failure to receive expected mobile device data after an attempt to remotely wake up the application may be recorded in a log. Such a failure may result from various user actions, as discussed further below. Based on an analysis of the instances of failure recorded in the log (e.g., based on a high number of such instances, based on the timing of such instances, and/or based on a comparison to other users), an indication of a potentially fraudulent behavior associated with the user of the mobile device may be generated. In some instances, an alert may be generated indicating the potentially fraudulent behavior associated with the user of the mobile device. Additionally or alternatively, a stakeholder such as an insurer may treat an indication of potentially fraudulent behavior associated with the user of the mobile device as an indication that the user is likely operating a vehicle at the time(s) of the indication.

Such a technique may offer numerous benefits. In particular, the systems and methods described herein may effectively and efficiently determine that potentially fraudulent behavior is associated with the user of a mobile device, and act accordingly. As discussed above, alerts may be generated, which alerts may be, for instance, "flags" on a user's insurance account. Based on the alerts, an insurance provider may provide recommendations to the user to stop the behavior, or may modify certain rewards or discounts based on the behavior, for example. In embodiments, alerts and recommendations may be generated in real time, as soon as an indication of potentially fraudulent user behavior has been identified, allowing the behavior and/or the rewards/discounts to be corrected or modified quickly, and reducing the time in which the potentially fraudulent user behavior may persist unnoticed. It should be appreciated that other benefits are also envisioned.

Furthermore, the systems and methods discussed herein address a challenge that is particular to data capture and transmission technology. In particular, the challenge relates to preventing fraud in vehicle trip telemetry data captured by user mobile devices, because in that particular context users may manipulate the capture, recording, and transmission of mobile device data. For example, at the outset of a vehicle trip, a user may uninstall an application of the mobile device configured to record and transmit vehicle trip data, or disable the permissions that allow the application to access mobile device sensors in order to capture data during a vehicle trip. Alternatively, a user may power down the mobile device during vehicle trips, or may disable network connectivity to prevent transmission of mobile device data. Using conventional methods, such manipulation of mobile device data might go unnoticed by stakeholders (e.g., insurance providers) for a long time, or indefinitely. However, missing data may yield an inaccurate determination of the number, frequency (e.g., number of trips per day, per month, etc.) and/or duration of vehicle trips by the user, which might, for instance, skew the application of insurance rewards and/or discounts that may be based on the frequency and/or duration of the user's vehicle trips.

The systems and methods described herein offer improved capabilities to solve these problems, including by automatically and periodically attempting to remotely wake up (e.g., launch or change to an active mode) a mobile device application that transmits mobile device data to a remote computer device. When installed and properly functioning, the mobile device application should launch (if not already executing), and/or wake up (e.g., from a reduced power mode, background mode, sleep mode, or other dormant executing mode) in response to the attempt, and transmit mobile device data, including sensor data captured by one or more sensors disposed on or within the mobile device to the remote computing device. Alternatively or additionally, the mobile device may be in communication with one or more nearby sensors (e.g., sensors mounted to the vehicle), in which case the application may collect and transmit/relay the external sensor data. In some embodiments, the properly functioning mobile device application may also, or instead, transmit other mobile device data, such as, e.g., data indicating the permission of the mobile device application to access one or more of the sensors and/or other non-sensor data.

When potentially fraudulent user behavior occurs (e.g., when a user revokes sensor permissions, uninstalls the application, disables network connectivity, and/or powers down the mobile device during vehicle operating periods, etc.), however, the mobile device application may not wake up, or may not capture/transmit the expected mobile device data. The remote computing device may then determine, based on a particular attempt to remotely wake up the application, that one or more expected types of mobile device data have not been received by the remote computer device. For example, the response may include, e.g., battery power level data but not location data. As another example, there may be no response at all (and thus, no mobile device data) during a particular time period in which a response would be expected. The remote computing device may record the failure to receive one or more expected types of mobile device data in a log. In some instances, the remote computing device may also record any mobile device data that is received (i.e., in addition to an indication of the failure to receive one or more expected types of mobile device data).

By dynamically analyzing the logged instances of failure to receive expected mobile device data, data consistent with potentially fraudulent user behavior may be identified. In some configurations, the failure to receive some or all of the expected mobile device data may be analyzed in conjunction with other supplementary data. For example, dates and/or times associated with each failure may be analyzed in conjunction with information specific to habits of the user, such as times when a particular user is likely to be operating a vehicle. Furthermore, in some instances, an alert may be generated indicating the potentially fraudulent behavior associated with the user of the mobile device. Accordingly, insurance providers or other entities (e.g., fleet managers) may take steps to address the potentially fraudulent behavior, e.g., by generating recommendations for users exhibiting potentially fraudulent behavior, and/or by adjusting the rewards or discounts provided to such users appropriately. As seen from the foregoing and the following description, the disclosed systems and methods provide a solution that is necessarily rooted in computer technology (e.g., automatic attempts to remotely wake up a mobile device application, and the analysis of data pertaining thereto) in order to overcome the noted shortcomings that specifically arise in the realm of vehicle telematics data capture technology.

Similarly, the systems and methods provide improvements in a technical field, namely, vehicle telematics data capture. Instead of merely being performed by way of conventional computer functions, for example, the systems and methods described herein attempt to remotely wake up an application installed on a mobile device, receive indications of whether sensor data has been received after attempts to wake up the application, analyze the mobile device data to determine when instances of failure to receive sensor data are consistent with potentially fraudulent behavior, and/or generate alerts indicating the potentially fraudulent behavior associated with the user of the mobile device.

In some implementations, the systems and methods may support a dynamic, real-time or near-real-time analysis of any captured, recorded, transmitted and/or received data. In particular, the remote computer device may receive mobile device data in real-time or near real-time, and may automatically and dynamically analyze the mobile device data. The remote computer device may also automatically and dynamically generate relevant alerts in real-time or near-real-time. In this regard, any insurance provider (or other entity) or user who receives such an alert is afforded the benefit of accurate, relevant, and timely data, and may, for instance, quickly take steps to resolve potentially fraudulent user behavior.

FIG. 1 depicts an exemplary system 100 for identifying potentially fraudulent user behavior related to the capture of vehicle trip telemetry data. The high-level architecture illustrated in FIG. 1 may include both hardware and software applications, as well as various data communications channels for communicating data between the various hardware and software components, as is described below. The system 100 may include a mobile device 102, which may be any type of suitable mobile device, such as a mobile phone, a smart phone, a smart watch, wearable electronics, a dedicated mobile device for preventing fraudulent user behavior in the capture of vehicle trip telemetry data, etc. In particular, the mobile device 102 may be associated with a user (not shown), who may, for instance, carry or wear the mobile device 102, or otherwise keep it nearby. The mobile device 102 may be configured to communicate with a remote computing device 104, e.g., via a network 106, which may be a wireless network, or which may include a combination of wireless and wired networks. The user of the mobile device 102 may occasionally take vehicle trips, during which the mobile device 102 may be located in a vehicle 108, which may be any type of vehicle, such as an automobile, motorcycle, boat, jet-ski, snowmobile, etc.

The mobile device 102 may include various sensors 110, a display 112, a processor 114, and a memory 116. The processor 114 may include one or more processors (e.g., one or more CPUs and possibly one or more GPUs), and may be configured to execute software applications residing on the memory 116, including, e.g., an application 118 configured to transmit mobile device data when "woken up" (e.g., launched and/or changed to an active mode), and a heartbeat unit 120 configured to automatically wake up the application 118 in response to a triggering "heartbeat" message/signal from the remote computing device 104 and/or autonomously, as discussed further below.

The sensors 110 disposed at and/or in communication with the mobile device 102 may be configured to capture sensor data, such as, e.g., position data and motion data, which may be indicative of, inter alia, time periods in which a user of the mobile device 102 is operating the vehicle 108. The sensors 110 may include, for instance, a GPS unit, an accelerometer, a speedometer, a magnetometer, and/or any other suitable sensors. In particular, sensor data detected by the sensors 110 may be transmitted to the remote computing device 104 via the network 106, and analyzed by the remote computing device 104 in order to determine one or more time periods in which a user of the mobile device 102 may be operating a vehicle, including, e.g., the number and/or frequency of vehicle trips (e.g., 3 vehicle trips, 10 trips per week, etc.) associated with a user of the mobile device 102 and/or the duration of one or more vehicle trips (e.g., one trip may be an hour long, a second trip may be 20 minutes long, etc.) associated with the user of the mobile device 102. The number, frequency and/or duration of vehicle trips may in some embodiments be used for the purpose of determining various rewards or discounts for the user of the mobile device 102. As an example, fewer or shorter vehicle trips may result in greater rewards or discounts for the user, e.g., from the user's insurance provider. As another example, the number, frequency and/or duration of vehicle trips may be used by a fleet manager to confirm when particular drivers and/or vehicles were on the road.

A display 112 may be disposed at the mobile device 102 and may be configured to display text and/or graphic user interfaces (GUIs) as instructed by the processor 114. The display 112 may present any alerts, notifications, recommendations, etc., that are generated by the processor 114. For instance, the display 112 may be configured to display alerts indicating potentially fraudulent behavior associated with the user of the mobile device 102, and/or recommendations for the user based on such potentially fraudulent behavior, as discussed in further detail below. The display 112 may be, e.g., a screen of the mobile device 102. In some embodiments the display 112 may include a user interface configured to receive input from the user of the mobile device 102, e.g., the display 112 may be a touch screen.

As discussed above, the memory 116 may include an application 118 configured to transmit mobile device data when "woken up" (e.g., launched and/or changed to an active mode), and a heartbeat unit 120 configured to automatically wake up the application 118 in response to a triggering "heartbeat" message/signal. In some instances, the application 118 may be installed on the mobile device 102 but may not be currently executing when a heartbeat signal is received. In such instances, the heartbeat unit 120 may launch the application 118 and cause the application 118 to begin executing, which may include, e.g., capturing sensor data and transmitting mobile device data (which may include the sensor data) to the remote computing device 104. In some embodiments, the application 118 may remain running after transmitting the mobile device data, while in other embodiments, the application 118 may automatically stop executing after the transmission.

In other instances, the application 118 is already launched but running in a background mode (e.g., a sleep mode, a reduced power mode, a dormant mode, or some other mode in which the application may be running but not operating at full capacity) when a heartbeat signal is received. While in the background mode, the application 118 may be executing, but may not be transmitting mobile device data to the remote computing device 104. For instance, the application 118 may, while in background mode, periodically or continuously capture sensor data recorded by the sensors 110, sensor permission status data (i.e., whether the application has permission to access sensor data at a given time), and/or battery power status (e.g., 100%, 50%, 2%, etc.). In such instances, the heartbeat unit 120 may wake up the application 118, e.g., cause the application 118 to transmit mobile device data to the remote computing device 104. In some embodiments, the application 118 may remain woken up after transmitting the mobile device data, while in other embodiments, the application 118 may automatically return to the background mode after the transmission.

In some embodiments, the heartbeat unit 120 may be part of application 118, while in other embodiments the heartbeat unit 120 may be, or may be part of, a separate application. Additionally or alternatively, in some embodiments, the heartbeat unit 120 may be configured to automatically and/or periodically attempt to wake up the application 118, in an autonomous manner (i.e., without being triggered by a heartbeat signal received from remote computing device 104). In particular, the heartbeat unit 120 may attempt to wake up the application 118 after a determination that a certain amount of time has passed since a previous attempt to wake up the application. That is, the heartbeat unit 120 may attempt to wake up the application every 5 seconds, or every minute, or every hour, etc. As another example, the heartbeat unit 120 may be configured to attempt to wake up the application 118 after a determination that the mobile device 102 has changed positions, e.g., by a distance greater than a threshold distance. The heartbeat unit 120 may determine that the mobile device 102 has changed locations by a certain distance based on, e.g., location information detected by the sensors (e.g., GPS information), or by other means such as WiFi or cellular tower triangulation or trilateration. In various different embodiments, the heartbeat unit 120 is configured to attempt to wake up the application 118 only autonomously, only in response to heartbeat signals from the remote computing device 104, or both autonomously and in response to heartbeat signals from the remote computing device 104.

The remote computing device 104 may be a server (or a collection of multiple co-located or geographically distributed servers, etc.), and may include one or more processors 122 and one or more memory 124. The one or more processors 122 may be configured to execute any of the various software applications residing on the memory 124. Moreover, the memory 124 may include multiple memories, which may be implemented as semiconductor memories, magnetically readable memories, optically readable memories, biologically readable memories, and/or any other suitable type(s) of memory. Furthermore, the memory 124 may include one or more non-transitory, computer-readable storage media.

In the embodiment of FIG. 1, the memory 124 stores a heartbeat trigger application 126, a vehicle trip analyzer 128, a log 130, and an alert generator 132. Generally, the heartbeat trigger application 126 may cause the remote computing device 104 to generate and send "heartbeat" messages or signals to the mobile device 102, which in turn causes heartbeat unit 120 to wake up the application 118 as discussed above. The vehicle trip analyzer 128 analyzes sensor data received from the mobile device 102 to identify time periods in which a user of the mobile device is operating a vehicle, and the log 130 is used to record any instances of failure to receive one or more expected types of mobile device data after attempts to remotely wake up the application 118. The alert generator 132 generates alerts indicating potentially fraudulent behavior associated with the user of the mobile device based on the instances of failure to receive sensor data, as recorded in the log 130. Of course, this is not an exhaustive list of the applications that may be included in the memory 124, and various embodiments and configurations may include additional, fewer, and/or alternative applications.

Figure 2:
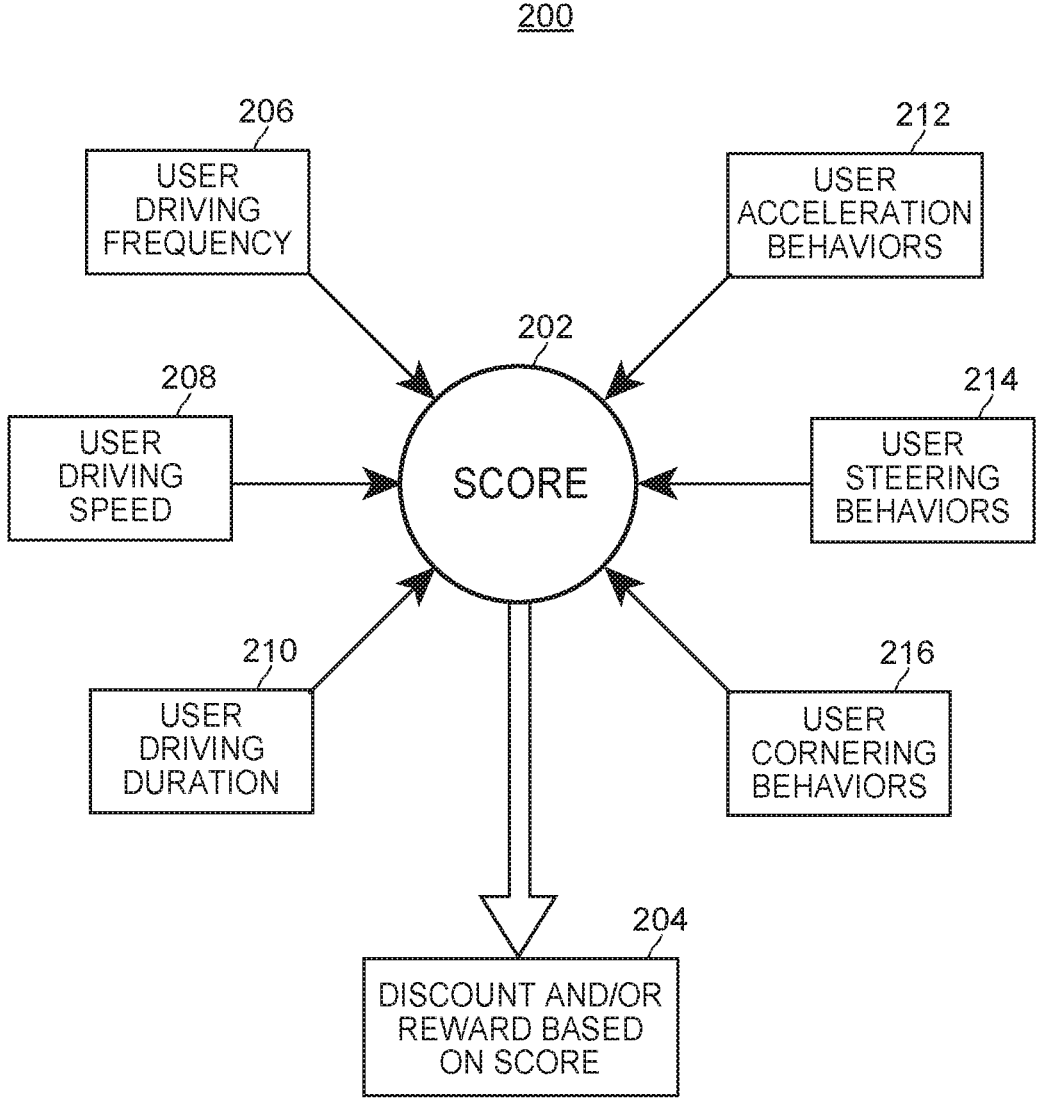
FIG. 2 depicts an exemplary data flow in which a user reward or discount may be provided based on vehicle telemetry data.

FIG. 2 depicts an exemplary data flow 200 in which a user reward or discount may be provided based on vehicle telemetry data, which is described herein to illustrate one particular context in which the system 100 (and the corresponding techniques) may be useful. As discussed above, a user of a mobile device (e.g., mobile device 102 of FIG. 1) may receive certain discounts and/or rewards based on sensor data indicative of time periods in which the user of the mobile device may be operating a vehicle. Based on the sensor data, the number, frequency and/or duration of user vehicle trips may be determined. Accordingly, an insurance provider may grant discounts or rewards to users who take fewer or shorter trips. The data flow 200 illustrates an example of how a user discount or reward may be determined. A user score 202 may be calculated based on the sensor data transmitted by the mobile device associated with a user, and a discount and/or reward 204 may be generated based on the user score 202.

Various user statistics obtained and/or derived from the sensor data may be factored into the determination of the user score 202. For example, a user driving frequency 206, a user driving speed 208, and/or a user drive duration 210 may be used to determine the user score 202. For instance, a lower driving frequency 206 may indicate a decreased likelihood of user vehicle accidents, and may accordingly correlate with a better score 202, while a higher driving frequency 206 may indicate an increased likelihood of vehicle accidents and correlate with a worse score 202. As another example, a lower user driving speed 208 (e.g., average absolute speed, and/or average speed relative to the speed limit, etc.) may indicate generally safer driving practices, and may correlate with a better score 202, while a higher driving speed 208 may indicate generally less safe driving practices, and correlate with a worse score 202. Additionally, a shorter user drive duration 210 may indicate that user vehicle trips are typically short, indicating that the user may be more likely to be alert and focused throughout the trip, and may accordingly correlate with a better score 202. In contrast, a longer user drive duration 210 may indicate that user vehicle trips are typically long, indicating that the user may be more likely to be sleepy or distracted during trips, and correlate with a worse score 202. In some embodiments, additional or alternative user driving behavior data, e.g., user acceleration behaviors 212, user steering behaviors 214, user cornering behaviors 216, and/or any other suitable using behavior data, may also be factored into the determination of the user score 202.

Accordingly, the reward or discount 204 for a particular user may be adjusted based on the user's score 202. That is, a better score 202 may cause the reward or discount 204 to be increased, while a worse score 202 may cause the reward or discount 204 to be decreased. The user's score 202 and, consequently, the user's reward or discount 204 may be recalculated periodically, and adjusted based on the user's recent driving behavior as indicated by sensor data transmitted by a mobile device associated with the user. In some embodiments, the user's reward or discount 204 may be readjusted based on "flags" on the user's account indicating potentially fraudulent user behavior. For instance, infrequent flags may cause the reward or discount 204 to increase, while frequent flags may reduce the reward or discount 204. Of course, these are only examples of several ways in which mobile device sensor data may be used to adjust a user reward or discount. Other means of determining a reward or discount (including more, fewer, and/or different data inputs than those shown in FIG. 2) may be envisioned by those skilled in the art.

Figure 3:
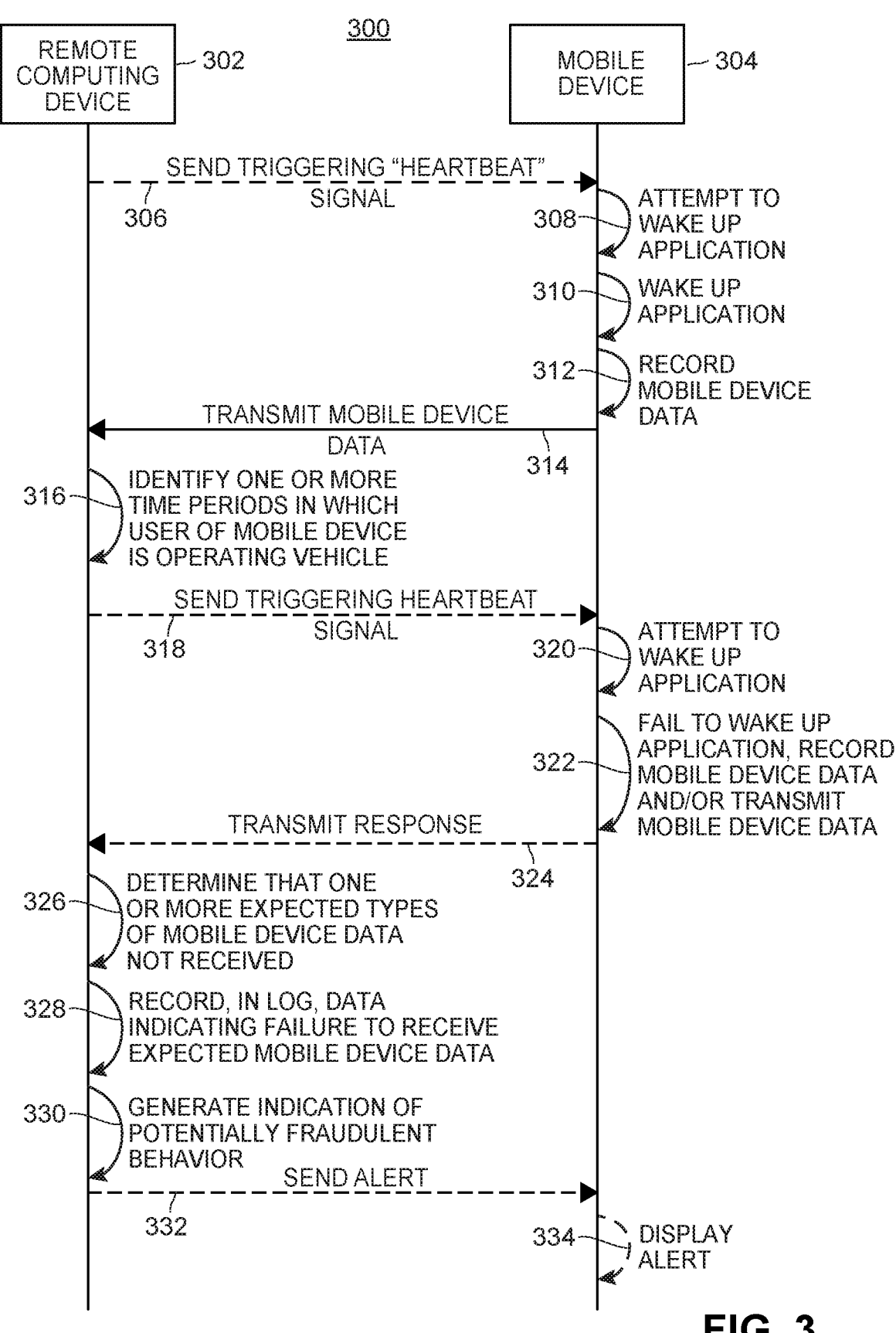
FIG. 3 depicts an exemplary sequence in which potentially fraudulent user behavior, related to the capture and/or transmission of vehicle trip telemetry data, may be identified.

FIG. 3 depicts an exemplary sequence 300 in which potentially fraudulent user behavior related to the capture of vehicle trip telemetry data is identified. The sequence 300 depicts the actions of a remote computing device 302 (e.g., remote computing device 104 of FIG. 1) and a mobile device 304 associated with a user (e.g., mobile computing device 102 of FIG. 1). It should be appreciated that additional or alternative actions, and/or actions performed by additional or alternative components and/or devices, are also envisioned.

The sequence 300 may begin when the remote computing device 302 optionally sends (306) a triggering "heartbeat" signal (i.e., message) to the mobile device 304. The remote computing device 302 may send such heartbeat signals periodically (e.g., every five seconds, every minute, every hour, etc.) in some configurations. Additionally or alternatively, the remote computing device 302 may send such heartbeat signals/messages in response to certain detected conditions, such as, e.g., in response to an indication that the mobile device 304 has changed position by a distance greater than a threshold distance (e.g., since a previous heartbeat signal). The indication may be obtained from, e.g., a GPS update from the mobile device 304, or from a GPS update (or WiFi or cellular triangulation or trilateration update) from a location and/or positioning server.

In response to the request, a heartbeat module or application installed on the mobile device 304 (e.g., heartbeat unit 120 of FIG. 1) may receive the heartbeat signal and may cause the mobile device 304 to attempt (308) to wake up an application (e.g., application 118 of FIG. 1) configured to transmit mobile device data (e.g., data captured by mobile device sensors 110 of FIG. 1, and/or sensor permission status data) when woken up. In some instances, waking up the application may include launching the application when it is not currently running, while in other instances waking up the application may include, e.g., causing an application running in a dormant, background mode to switch to an active mode.

Additionally or alternatively, in some embodiments, the heartbeat module of the mobile device 304 may attempt to wake up the application periodically (e.g., every five seconds, every minute, every hour, etc.), or based on an indication that the mobile device 304 has changed position (e.g., the previous position of the mobile device 304 is greater than a threshold distance away from the current position).

In a successful attempt, the mobile device 304, via the heartbeat application, wakes up (310) the application. In some embodiments, successfully waking up the application may cause the mobile device 304 to record (312) sensor data captured by one or more mobile device sensors, including, e.g., location/position data, movement data, the current battery state of the mobile device, whether the mobile device is currently charging, etc. In some instances, the mobile device 304 may additionally or alternatively record other mobile device data such as, e.g., the permission status of various mobile device sensors. In some embodiments, the mobile device 304 may record data in the background mode prior to wakeup. In any case, upon wakeup, the mobile device may transmit (314) any recorded mobile device data to the remote computing device 302 (e.g., via the network 106 of FIG. 1).

Based on the transmitted sensor data, the remote computing device 302 may identify (316) one or more time periods in which a user of the mobile device may be operating a vehicle. The remote computing device 302 may use the identified time period(s) to determine a number, frequency, and/or duration of vehicle trips associated with the user of the mobile device 304, for example. That is, the position and/or motion of the mobile device 304, as indicated by the sensor data, may be a proxy for the position and/or motion of the user of the mobile device 304. Certain sensor data may indicate vehicular motion, and may therefore indicate that the user of the mobile device 304 may have been on operating a vehicle during the time when the data is recorded. For instance, the number of vehicle trips may be determined by analyzing the sensor data to determine periods of motion consistent with vehicle motion and counting the number of such periods. Similarly, the duration of vehicle trips may be determined by analyzing the sensor data to determine periods of motion consistent with vehicle motion and calculating the length of these periods. Based on a determined number, frequency, and/or duration of vehicle trips associated with the user, the user may receive certain and/or rewards, as discussed above at FIG. 2. For instance, an insurance provider may grant discounts or rewards to insured users who take fewer or shorter trips.

The remote computing device 302 may again optionally send (318) a triggering heartbeat signal or message. As discussed with respect to 306, the remote computing device 302 may send such heartbeat signals periodically or in response to certain detected conditions. In response to the triggering heartbeat signal or message, the mobile device 304 may attempt (320) to wake up the application described above. In the scenario corresponding to the exemplary sequence 300, however, the mobile device 304 fails (322) to wake up the application, to record one or more types of mobile device data, and/or to transmit one or more types of mobile device data to the remote computing device 302. These failures may occur for several different reasons. As one example, the application may have been uninstalled from the mobile device 304 (e.g., by the user of the mobile device 304). As another example, sensor permissions allowing the application to obtain data from one or more of the sensors of the mobile device 304 may have been revoked (e.g., by the user of the mobile device 304). In instances of this latter example, the application may still wake up, and may still transmit some mobile device data to the mobile device 304, such as, e.g., sensor permission status data indicating a lack of sensor permissions. As still another example, the communication functionality of the mobile device 304 (e.g., to enable communications via a network such as network 106) may have been disabled (e.g., by the user of the mobile device 304), in which case the mobile device 304 may wake up and may record various types of mobile device data, but fail to transmit any of the recorded data. As yet another example, the mobile device 304 may have been powered down (e.g., by the user of the mobile device 304). Of course, other reasons for the failure, also (potentially) reflective of a deliberate attempt by the user of the mobile device 304 to prevent the proper collection and/or transmission of mobile device data, are also possible.

After the failure (322), the mobile device 304 may optionally transmit a response (324), which may be incomplete (e.g., missing one or more expected types of mobile device data). Of course, as discussed above, the mobile device 304 may in some embodiments and/or scenarios fail to transmit any response at all.

The remote computing device 302 may determine (326), based on the response to the attempt to wake up the application (or lack thereof), that one or more expected types of mobile device data have not been received from the mobile device 304. As one example, the remote computing device 302 may determine that the response includes data indicating a lack of permission for application 118 to access sensors, but no sensor data. As another example, the remote computing device 302 may determine that the response includes one type of expected sensor data but not another type of expected sensor data, e.g., position data but not acceleration data. In some instances, there may not be a response at all, and none of the expected mobile device data is received. A lack of response may be determined, for instance, if and only if none of the expected mobile device data has been received after a certain period of time has passed (e.g., since the attempt 320, or since a previous receipt of mobile device data).

Accordingly, the remote computing device 302 may record (328), in a log, data indicating that the one or more types of the expected mobile device data have not been received by the remote computer device 302. The log may additionally include a time stamp for particular instances of failure to receive the expected mobile device data, e.g., corresponding to particular attempts. Furthermore, the log may additionally include data indicating any mobile device data that is received, and/or data indicating previous or subsequent successful receipts of mobile device data.

Based on an analysis of the logged type(s) of the expected mobile device data that have not been received by the remote computer device 302 (e.g., failure instances), and time-stamps associated therewith, the remote computing device 302 may generate (330) an indication of potentially fraudulent behavior associated with the user of the mobile device 304. Fraudulent behavior may include, for instance, attempts by the user to manipulate the mobile device data received by the remote computing device 302 in order to receive rewards and/or discounts based on shorter or less frequent vehicle trips. For example, as noted above, a user may in some instances power down the mobile device 304, uninstall the application, disable permissions, and/or disable communication functionality of the mobile device 304 such that sensor data indicative of vehicle trips is not recorded, or is not transmitted to the remote computing device 302. A certain number and/or frequency of failure instances (e.g., ten failure instances, or ten failure instances in one day) may be consistent with potentially fraudulent behavior of a user associated with the mobile device 304, for example. As another example, a certain number of failure instances as compared to the number of success instances (e.g., more failure instances than success instances in a given week) may also be consistent with potentially fraudulent user behavior. As yet another example, a certain number of failure instances compared to the failure instances of other users (e.g., a greater number and/or frequency of failure instances than other users, a greater number of failure instances compared with similar users, a higher number of failure instances for a particular time of day compared with other users, etc.) may be consistent with potentially fraudulent user behavior.

In some embodiments, the indication of the potentially fraudulent behavior associated with the user of the mobile device 304 may include an alert. An alert indicating potentially fraudulent behavior by the user may be, for instance, a flag in a data record associated with the account of the user (e.g., in an insurance database). In some configurations, the remote computing device 302 may send (332) the alert to the mobile device 304, and the mobile device 304 may display (334) the alert to the user. The alert may include a message to the user relating to the potentially fraudulent behavior. In some instances, the message may be a recommendation to the user, such as a recommendation to re-install the application, to re-grant sensor permissions, to re-enable communication functionality, or to otherwise cease the potentially fraudulent behavior, for instance. The application executing on the mobile device 304 may receive the message, for example, and cause a display screen of the mobile device 304 to show the message. Alternatively, the remote computing device 302 may send the message as a text or email message, or in another suitable manner.

FIG. 4 depicts an exemplary method 400 for identifying potentially fraudulent user behavior related to the capture of vehicle trip telemetry data. The method 400 may be implemented by a computing system, such as one or more servers of the remote computing device 104 of FIG. 1, for example.

In the method 400, an application may be provided (e.g., to a mobile device such as mobile device 102 of FIG. 1) (block 402). The application may be configured to transmit mobile device data when woken, including, for example, sensor data (e.g., location data, velocity data, accelerometer data, time data, battery power level data, etc.) captured by one or more sensors of the mobile device. In some embodiments, the mobile device data may additionally or alternatively include data indicative of a lack of permission to access one or more sensors of the mobile device (i.e., sensor permission status data). The lack of permission may be universal, or specific to the provided application.

Thereafter, an attempt may be made to remotely wake up the provided application (block 404). The attempt may be made automatically and/or periodically. For example, the attempt to remotely wake up the application may be automatically triggered by a determination that a certain amount of time has passed since a previous attempt to wake up the application was made. For instance, if one minute (or ten seconds, or five minutes, etc.) has passed since a previous attempt to remotely wake up the application, a fresh attempt to wake up the application may be made. In some embodiments, an attempt to remotely wake up the application may also, or instead, be triggered by an indication that the mobile device has changed location by a distance greater than a threshold distance (e.g., since a previous attempt to wake up the application was made). The attempt may be triggered based on one or more mobile device locations detected by a GPS sensor of the mobile device, or based on a WiFi triangulation or trilateration of the location of the mobile device. Such location data may be transmitted to a computing system implementing the method 400 by the mobile device (e.g., when triggered by the application), or may be obtained from another source (e.g., a server supporting a location/positioning service for the mobile device, or one or more WiFi access points, etc.).

Attempting to remotely wake up the application may include sending a request (e.g., a triggering "heartbeat" message and/or signal) to the mobile device, with the mobile device being configured to wake up the application upon receipt of the request. For instance, a module (e.g. heartbeat unit 120 of FIG. 1) of the application may be configured to receive requests and wake up the application upon receipt of any given request. Additionally or alternatively, the heartbeat unit may be configured to automatically wake up the application after the certain amount of time has passed or based on an indication that the mobile device has changed location (e.g., according to GPS data) by a distance greater than a threshold distance since a previous attempt to wake up the application, in some cases regardless of whether a request has been received from a computing system implementing the method 400.

Additionally, the attempt may include a determination of whether the application is currently running on the mobile device. If the application, at the time of the request, is not currently running on the mobile device, the attempt may include an attempt to launch the application. If the application, at the time of the request, is currently running on the application, the attempt may simply be an attempt to change a mode of the application. For example, the application may be currently running in a background mode (e.g., a sleep mode, a dormant mode, a reduced power mode, etc.), and the heartbeat message may cause the application to enter an active mode. In some instances, the application may capture sensor data while in the background mode and, upon waking up, the application may enter a new, active mode (e.g., an awake mode, a foreground mode, a transmitting mode, a higher power mode, etc.) and transmit any captured sensor data.

One or more time periods in which a user of the mobile device may be operating a vehicle may be identified, based at least in part on the received sensor data (block 406). For instance, the sensor data may be analyzed to identify data consistent with vehicle motion. For example, certain accelerations and velocities, or other suitable data captured by the sensors of the mobile device may indicate likely vehicle motion. Based on times associated with the identified vehicle motion data, including likely starting and/or stopping times, a number, frequency, and/or duration of vehicle trips may be determined. In some embodiments, the number, frequency, and/or duration of the vehicle trips associated with the user may be used to generate certain discounts and/or rewards, e.g., as offered by an insurance provider of the user. For instance, a user who makes fewer and/or shorter vehicle trips may receive a greater discount or reward than a user who makes more and/or longer vehicle trips, as discussed in greater detail above with respect to FIG. 2.

Based on a particular attempt to remotely wake up the application, it may be determined that one or more types of the expected mobile device data have not been received (block 408). The response may be, for instance, a response that includes some expected mobile device data, but not all of the expected mobile device data. For example, the response may include location data but not acceleration data. In some instances, the response may not include any of the expected mobile device data. In other instances, no response may be received at all, e.g., after a predetermined period of time (e.g., one minute, five minutes, one hour, etc.) has passed since the attempt.

There may be any number of reasons why one or more types of the expected mobile device data have not been received after a particular attempt to wake up the application. For instance, the mobile device sensors may be blocked, broken, or otherwise malfunctioning. As another example, the user may have revoked a mobile device permission allowing the sensors to capture data, or a mobile device permission allowing the application to access and/or record the data captured by the sensors. As still another example, the user may have uninstalled the application. As a further example, the mobile device may be disconnected from a cellular or wireless network used for data transmission, e.g., due to disabling by the user (e.g., via network configuration settings) or due to an area of poor network coverage, for instance. Additionally, the mobile device may be powered off and therefore may be unable to record or transmit any mobile device data. Of course, additional or alternative reasons may be envisioned.

Data indicating that the one or more types of the expected mobile device data have not been received (i.e., failure instances) may be recorded in a log (block 410). The log may include a time associated with each failure to receive expected mobile device data. In some instances, data indicating any mobile device data that has been received by the remote computer device may also be recorded in the log. As indicated above, some reasons for failure may be innocuous (e.g., if the mobile device loses network connectivity in a poor-coverage area), and not indicative of fraud. In some embodiments, therefore, a failure may only be recorded in the log if other data (e.g., known user behaviors) indicates that the failed attempt is likely due to fraud. In other embodiments, all failures may be recorded in the log.

An indication of potentially fraudulent behavior associated with the user of the mobile device may be generated based on the log (block 412). In various embodiments, the indication may be an alert, which may include, for instance, a flag associated with an account of the user (e.g., to be presented to an employee of an insurance company, or to be sent in an email, etc.). The content of the log may be analyzed to determine which failure instances likely indicate fraudulent activity and which failure instances are more likely innocuous. In some embodiments, an indication of potentially fraudulent behavior associated with a user of the mobile device may be generated based on the number of recordings in the log. For instance, a high number of instances of expected mobile device data not being received in the log (e.g., ten instances, one hundred instances, etc.), especially over a particular time period (e.g., fifteen instances in one day, fifty instances in one week, etc.), may indicate potentially fraudulent behavior, and may thus cause the alert to be generated. That is, a frequent failure to receive one or more types of expected mobile device data may indicate that the user is preventing the recording or transmitting of the mobile device data in some way (e.g., by revoking sensor permissions, by disabling network connectivity, by uninstalling the application for recording and transmitting mobile device data, and/or by powering off the mobile device). On the other hand, a low number or low frequency of failure instances may be less likely to be indicative of fraud, and more likely to be innocuous. For example, network connectivity may be occasionally be lost when a user enters an area with poor reception, and/or users may occasionally disable network connectivity for innocuous reasons (e.g., to save battery power), resulting in occasional failures to transmit mobile device data.

Additionally or alternatively, the indication of potentially fraudulent behavior associated with the user of the mobile device may be generated based on the times associated with one or more recordings in the log. For example, recordings in the log indicating that the one or more types of expected mobile device data have not been received during typical times of vehicle operation (e.g., peak rush hour times such as 7:00 am to 9:00 am, 5:00 pm to 7:00 pm, etc.) may correlate with potentially fraudulent user. That is, failure to receive mobile device data during typical times of vehicle operation may indicate that a user is preventing the recording or transmitting of sensor data, i.e., exhibiting fraudulent behavior. On the other hand, a failure to receive mobile device data during off-peak times of vehicle operation (e.g., during the middle of the night) may be less likely to be indicative of fraud, and more likely to be innocuous. For example, users may occasionally power off the mobile device for non-fraudulent reasons (e.g., while sleeping), resulting in failures to transmit mobile device data during off-peak times of vehicle operation.

Moreover, in some embodiments, the indication of potentially fraudulent behavior associated with the user of the mobile device may be generated based on a comparison of the recordings in the log associated with the user of the mobile device to recordings in logs associated with other users. For instance, if the user has a greater logged number of instances of failure to receive mobile device data than other users, this may indicate potentially fraudulent behavior by the user and cause the alert to be generated. Similarly, if the user has more logged instances of failure to receive mobile device data at peak times of vehicle use than other users, this may indicate potentially fraudulent behavior by the user and cause the alert to be generated. In some instances, machine learning methods may also be used to cluster similar users and compare their logged data to one another to determine which users may exhibit potentially fraudulent behavior and cause alerts to be generated for those users. Of course, any other suitable means for comparing users to determine whether a user has exhibited potentially fraudulent behavior may be used to generate the alert in various configurations.

In some configurations, a recommendation for the user of the mobile device may be generated based on the indication of potentially fraudulent behavior associated with the user of the mobile device. For instance, the recommendation may be a notification displayed on a user interface of the mobile device with which the user is associated, and may include a recommendation for the user to re-install the application, enable sensor permissions, enable network connectivity, etc.

With the foregoing, an insurance customer may opt-in to a rewards, insurance discount, or other type of program. After the insurance customer provides their affirmative consent, an insurance provider remote server may collect data from the customer's mobile device, e.g., with the customer's permission or affirmative consent. The data collected may be related to insured assets before (and/or after) an insurance-related event, including those events discussed elsewhere herein. In return, risk averse insured persons, home owners, or home or apartment occupants may receive discounts or insurance cost savings related to home, renters, personal articles, auto, and other types of insurance from the insurance provider.

In one aspect, the types of data discussed elsewhere herein may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

What is claimed:

1. A computer-implemented method, comprising:

receiving, by a heartbeat module of a mobile device via a network from a remote computing device, a heartbeat signal;

in response to receiving the heartbeat signal by the heartbeat module of the mobile device, activating, by a processor of the mobile device, an application on the mobile device, wherein the application is activated from a dormant mode to an active or background mode;

collecting, by the application of the mobile device, mobile device data including vehicle trip telemetry data associated with one or more vehicle operations; and transmitting, by the application via the network to the remote computing device, the mobile device data for analysis to identify one or more time periods in which a user of the mobile device may be operating a vehicle;

receiving, by the application via the network from the remote computing device, an indication that one or more types of expected mobile device data of the vehicle trip telemetry data were not received by the remote computing device, wherein the remote computing device stores, in a memory of the remote computing device, absence data indicating an absence of the one or more types of expected mobile device data with a timestamp associated with the heartbeat signal; and receiving, by the application via the network from the remote computing device, an alert indicating potentially fraudulent behavior associated with the user of the mobile device, wherein the remote computing device generates the alert based on analyzing first data in the memory to identify a frequency of absences of the one or more types of expected mobile device data, wherein the frequency exceeds a predetermined threshold, and wherein the first data comprises the absence data.

2. The method of claim 1, wherein:

the remote computing device generates the alert further based on determining that the mobile device is configured to prevent transmission of the at least one of the one or more types of expected mobile device data.

3. The method of claim 1, wherein receiving the alert includes the remote computing device receiving data indicating that a first type of expected mobile device data was received by the remote computing device and a second type of expected mobile device data was not received by the remote computing device.

4. The method of claim 1, wherein receiving the heartbeat signal comprises:

receiving, by the heartbeat module via the network from the remote computing device, a first heartbeat signal at a first time;

receiving, by the heartbeat module via the network from the remote computing device, a second heartbeat signal at a second time, the second time occurring after the first time and separated from the first time by a predetermined time interval; and receiving, by the heartbeat module via the network from the remote computing device, a third heartbeat signal at a third time, the third time occurring after the second time and separated from the second time by the predetermined time interval.

5. The method of claim 1, wherein the mobile device data includes data indicative of a lack of permission to access one or more sensors of the mobile device.

6. The method of claim 1, further comprising:

receiving, by the application via the network from the remote computing device, data identifying one or more time periods in which the user of the mobile device is operating a vehicle, wherein the remote computing device identifies the one or more time periods based on the mobile device data.

7. The method of claim 1, further comprising:

determining, by the processor of the mobile device, whether the application is running; and based on the determining: (i) launching, by the processor of the mobile device, the application if the application is determined to not be running, or (ii) waking up, by the processor of the mobile device, the application if the application is running in the dormant mode.

8. The method of claim 1, wherein the heartbeat signal is received based on a location indication that the mobile device has changed to a second location, wherein a distance between the second location and a previous location of the mobile device is greater than a threshold distance, and wherein the previous location is a location of the mobile device when a previous heartbeat signal was received.

9. The method of claim 8, wherein the location indication is based on data detected by a Global Positioning System (GPS) sensor of the mobile device.

10. The method of claim 8, wherein the heartbeat module of the mobile device is part of the application of the mobile device.

11. A computing system comprising a remote computing device, including:

one or more processors; and one or more memories storing computer-executable instructions that, when executed by the one or more processors, cause the remote computing device to perform operations comprising:

sending, via a network, a heartbeat signal to a heartbeat module of a mobile device, wherein the mobile device is configured to activate, by a processor of the mobile device, an application on the mobile device from a dormant mode to an active or background mode upon receipt of the heartbeat signal by the heartbeat module of the mobile device;

receiving, via the network from the application of the mobile device, mobile device data, the mobile device data including vehicle trip telemetry data associated with one or more vehicle operations;

determining that one or more types of expected mobile device data, including the vehicle trip telemetry data, were not received in response to the heartbeat signal;

storing, in a memory of the remote computing device, absence data indicating an absence of the one or more types of expected mobile device data with a timestamp associated with the heartbeat signal;

generating an alert indicating potentially fraudulent behavior associated with a user of the mobile device based on analyzing first data in the memory to identify a frequency of absences of the one or more types of expected mobile device data, wherein the frequency exceeds a predetermined threshold, and wherein the first data comprises the absence data; and transmitting, via the network to the application of the mobile device, the alert indicating potentially fraudulent behavior.

12. The computing system of claim 11, wherein generating the alert further comprises determining that the mobile device is configured to prevent transmission of the one or more types of expected mobile device data.

13. The computing system of claim 11, wherein determining that the one or more types of expected mobile device data were not received includes determining that a first type of expected mobile device data was received and a second type of expected mobile device data was not received.

14. The computing system of claim 11, wherein sending the heartbeat signal comprises:

sending a first heartbeat signal at a first time;

sending a second heartbeat signal at a second time, the second time occurring after the first time, the first time and the second time being separated from each other by a predetermined time interval; and sending a third heartbeat signal at a third time, the third time occurring after the second time, the second time and the third time being separated from each other by the predetermined time interval.

15. The computing system of claim 11, wherein the mobile device data includes data indicating a lack of permission to access one or more sensors of the mobile device.

16. The computing system of claim 11, wherein the computer-executable instructions, when executed, further cause the remote computing device to identify one or more time periods in which the user of the mobile device is operating a vehicle based on the received mobile device data.

17. The computing system of claim 11, wherein the mobile device is further configured to, based on a determination by the processor of the mobile device of whether the application is running: (i) launch the application if the application is determined to not be running, or (ii) transition the application from the dormant mode to the active or background mode if the application is determined to be running in the dormant mode.

18. The computing system of claim 11, wherein the computer-executable instructions, when executed, further cause the remote computing device to send the heartbeat signal based on a location indication that the mobile device has changed to a second location, wherein a distance between the second location and a previous location of the mobile device is greater than a threshold distance, and wherein the previous location is a location of the mobile device when a previous heartbeat signal was sent.

19. The computing system of claim 18, wherein the location indication of the mobile device is based on data detected by a Global Positioning System (GPS) sensor of the mobile device.

20. The computing system of claim 18, wherein the heartbeat module of the mobile device is part of the application of the mobile device.

21. A non-transitory computer-readable medium storing instructions, wherein the instructions, upon execution by a processor of a mobile device, cause the processor to perform operations comprising:

receiving, by a heartbeat module of the mobile device via a network from a remote computing device, a heartbeat signal;

in response to receiving the heartbeat signal by the heartbeat module of the mobile device, activating, by the processor of the mobile device, an application on the mobile device, wherein the application is activated from a dormant mode to an active or background mode;

collecting, by the application of the mobile device, mobile device data including vehicle trip telemetry data associated with one or more vehicle operations; and transmitting, by the application via the network to the remote computing device, the mobile device data for analysis to identify one or more time periods in which a user of the mobile device may be operating a vehicle;

receiving, by the application via the network from the remote computing device, an indication that one or more types of expected mobile device data of the vehicle trip telemetry data were not received by the remote computing device, wherein the remote computing device stores, in a memory of the remote computing device, absence data indicating an absence of the one or more types of expected mobile device data with a timestamp associated with the heartbeat signal; and receiving, by the application via the network from the remote computing device, an alert indicating potentially fraudulent behavior associated with the user of the mobile device, wherein the remote computing device generates the alert based on analyzing first data in the memory to identify a frequency of absences of the one or more types of expected mobile device data, wherein the frequency exceeds a predetermined threshold, and wherein the first data comprises the absence data.

\* \* \* \* \*